(12) United States Patent
Nakamura et al.

(10) Patent No.: US 8,496,233 B2
(45) Date of Patent: Jul. 30, 2013

(54) VAPORIZATION FILTER FOR HUMIDIFICATION, VAPORIZATION FILTER LAMINATE FOR HUMIDIFICATION AND HUMIDIFICATION METHOD USING THESE

(75) Inventors: Takayuki Nakamura, Tokyo (JP); Hideki Hariguchi, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 496 days.

(21) Appl. No.: 12/742,394

(22) PCT Filed: Nov. 12, 2008

(86) PCT No.: PCT/JP2008/070547
§ 371 (c)(1),
(2), (4) Date: May 11, 2010

(87) PCT Pub. No.: WO2009/063884
PCT Pub. Date: May 22, 2009

(65) Prior Publication Data
US 2010/0258959 A1 Oct. 14, 2010

(30) Foreign Application Priority Data
Nov. 12, 2007 (JP) ................................. 2007-292675

(51) Int. Cl.
*B01F 3/04* (2006.01)
(52) U.S. Cl.
USPC ............................................ 261/92; 261/104

(58) Field of Classification Search
USPC ............................................... 261/91, 92, 104
See application file for complete search history.

(56) References Cited

U.S. PATENT DOCUMENTS

| | | | | |
|---|---|---|---|---|
| 4,381,921 | A * | 5/1983 | Pierce et al. | 436/535 |
| 4,725,386 | A * | 2/1988 | Gullas | 261/92 |
| 5,348,691 | A * | 9/1994 | McElroy et al. | 261/36.1 |
| 5,506,324 | A * | 4/1996 | Gartner et al. | 526/318.41 |
| 5,672,299 | A * | 9/1997 | Daneshvar | 261/142 |
| 5,738,808 | A * | 4/1998 | Iwamoto | 261/104 |
| 5,795,505 | A * | 8/1998 | Burns | 261/92 |
| 5,970,210 | A * | 10/1999 | Anthony | 392/386 |
| 8,066,263 | B1 * | 11/2011 | Soderlund | 261/92 |
| 8,079,574 | B2 * | 12/2011 | Lin | 261/104 |

FOREIGN PATENT DOCUMENTS

| | | |
|---|---|---|
| JP | 6-74500 A | 3/1994 |
| JP | 8-318587 A | 12/1996 |
| JP | 10-16104 A | 1/1998 |
| JP | 2002-106898 A | 4/2002 |
| JP | 2007-139251 A | 6/2007 |

* cited by examiner

*Primary Examiner* — Charles Bushey
(74) *Attorney, Agent, or Firm* — Birch, Stewart, Kolasch & Birch, LLP

(57) ABSTRACT

Provided is a vaporization filter for humidification including a filter substrate, and an anchor layer containing a film-forming polymer and a hydrophilic layer being provided on the substrate in this order. Further provided is a vaporization filter laminate for humidification which includes the vaporization filters for humidification being laminated each with a distance, and a humidification method using the same.

10 Claims, 2 Drawing Sheets

VAPORIZATION FILTER FOR HUMIDIFICATION, VAPORIZATION FILTER LAMINATE FOR HUMIDIFICATION AND HUMIDIFICATION METHOD USING THESE

TECHNICAL FIELD

The present invention relates to a vaporization filter for humidification, a vaporization filter laminate for humidification and a humidification method using these.

BACKGROUND ART

As a vaporization filter to be used in a humidifier, there is a material in which a part of a sheet state vaporization filter having a water-absorptive property is dipped in a water bath, water is subjected to suction by capillary phenomenon, and dry air is passed through to obtain humidified air (for example, see Patent Literature 1). However, in the vaporization filter with the system in which water is subjected to suction by capillary phenomenon, a minor amount of compounds containing an element such as silicon, calcium, magnesium, etc., which are contained in the supplied water causes scales and they attach to the vaporization filter, then, the effects of absorbing and raising water are decreased so that there is a problem that humidifying characteristics are lowered.

To solve such problems, there is disclosed a vaporization filter which comprises a foamy shaped substrate having a low water-absorptive property and a hydrophilic inorganic compound carried thereon, so that even when scales are attached, the humidifying characteristics are difficulty lowered (for example, see Patent Literature 2). However, even in the vaporization filter of Patent Literature 2, when it is used for a long period of time, lowering in humidification efficiency cannot be avoided due to attachment of scales to the inside of the foamy shaped substrate or voids at the surface layer, and no consideration has been done about long term durability in view of the humidification efficiency.

There has been also proposed a vaporization filter by providing voids with 10 to 25% using particles at the surface layer portion of a filter substrate having low water-absorption property, whereby the humidification efficiency are improved by maintaining water at the voids (for example, see Patent Literature 3). In the vaporization filter of Patent Literature 3, as the filter substrate, a foamy shaped (three-dimensional network structure) substrate has been used as in Patent Literature 2. Also, the surface layer portion having voids has a thickness of 10 μm or more, and the voids have a larger size of 1 to 3 μm$^2$. Thus, with regard to the vaporization filter of Patent Literature 3, when it is used for a long period of time, it is difficult to avoid lowering in humidification efficiency due to attachment of scales to the voids at the surface layer portion, and no consideration has been done about long term durability in view of the humidification efficiency.
[Patent Literature 1] JP Patent No. 2514145B
[Patent Literature 2] JP 2005-315554A
[Patent Literature 3] JP 2007-198685A

DISCLOSURE OF THE INVENTION

Problems to be Solved by the Invention

A problem to be solved by the present invention is to provide a vaporization filter for humidification, a vaporization filter laminate for humidification each having durability for a long period of time which can maintain humidification efficiency even when a humidifier is operated for a long term and a humidification method using these.

Means to Solve the Problems

The present inventors have intensively studied to solve the above-mentioned problems and as a result, they have invented the following mentioned vaporization filter for humidification, a vaporization filter laminate for humidification and a humidification method using these.
(1) A vaporization filter for humidification which comprises a filter substrate, and an anchor layer containing a film-forming polymer and a hydrophilic layer being provided on the substrate in this order,
(2) the vaporization filter for humidification of the above-mentioned (1), wherein said hydrophilic layer contains fine particles,
(3) the vaporization filter for humidification of the above-mentioned (2), wherein a ratio of a content of the fine particles in said hydrophilic layer is 30% by weight or more and 90% by weight or less,
(4) the vaporization filter for humidification of the above-mentioned (1), wherein said hydrophilic layer is cross-linked,
(5) the vaporization filter for humidification of the above-mentioned (1), wherein a thickness of said hydrophilic layer is 0.5 μm or more and 8.0 μm or less,
(6) a vaporization filter laminate for humidification which comprises the vaporization filters for humidification of any one of the above-mentioned (1) to (5) being laminated with a distance to each other,
(7) a humidifying method using the vaporization filter for humidification according to any one of the above-mentioned (1) to (5) or the vaporization filter laminate for humidification according to the above-mentioned (6), which comprises carrying out humidification by vaporizing water of a water layer formed on a surface of the hydrophilic layer,
(8) a humidifying method using the vaporization filter for humidification according to any one of the above-mentioned (1) to (5) or the vaporization filter laminate for humidification according to the above-mentioned (6), which comprises carrying out humidification by continuously vaporizing water of a water layer formed on a surface of the hydrophilic layer.

Effects of the Invention

A vaporization filter for humidification of the present invention comprises an anchor layer containing a film-forming polymer on a filter substrate, and, having a hydrophilic layer on the anchor layer. Water supplied to the vaporization filter for humidification of the present invention rapidly forms a water layer on the surface of the hydrophilic layer of the vaporization filter for humidification. In the humidifying method of the present invention, humidification efficiency can be maintained stably for a long term by vaporizing the water layer to carry out humidification. Also, in the vaporization filter for humidification of the present invention, it has been established an excellent effect that repeated uses are realized by washing the same even when scales are attached to the surface of the filter.

EXPLANATION OF REFERENCE NUMERALS

| | |
|---|---|
| 31: | Vaporization filter laminate for humidification |
| 32: | Opening portion |
| 33: | Vaporization filter for humidification (filter single plate) |
| 41: | Difference between steps |
| 42: | Opening portion |
| 43: | Filter substrate |
| 51: | Water tank |
| 52: | Water surface |
| 53: | Arrow showing rotating direction of the vaporization filter laminate for humidification |

BEST MODE TO CARRY OUT THE INVENTION

In the following, the vaporization filter for humidification of the present invention is specifically explained. In the following, the "vaporization filter for humidification" is abbreviated to state as the "vaporization filter" or the "filter".

Figure 1:
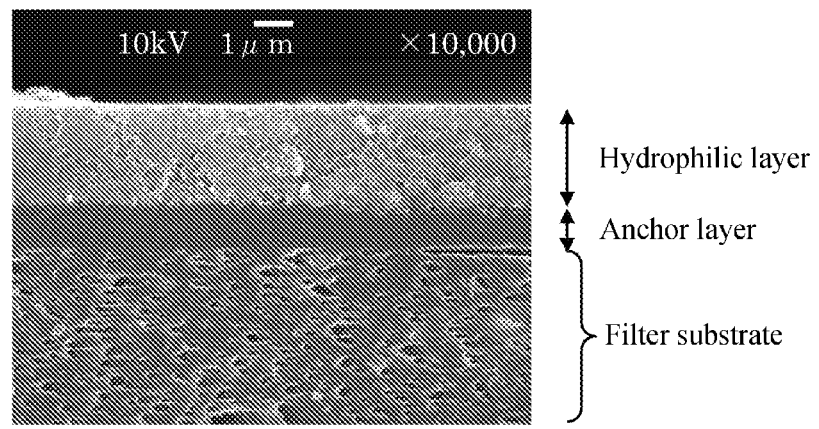
FIG. 1 This is an electron microscopic photograph showing one example of a sectional surface of a vaporization filter for humidification of the present invention.

FIG. 1 is an electron microscopic photograph of a sectional view showing one example of a vaporization filter of the present invention. The vaporization filter of the present invention has an anchor layer on a filter substrate, and further has a hydrophilic layer on the anchor layer. As the filter substrate, there may be used a plate made of a resin, a plate made of a metal such as stainless or aluminum, etc. A non-foamy shape plate made of a resin is preferably used since a water layer can be formed after providing an anchor layer and a hydrophilic layer, and further, attachment of scales can be controlled.

The resin to be used for the filter substrate is not particularly limited, and there may be mentioned, for example, an aromatic resin such as polystyrene resin, poly-ethylene terephthalate resin, etc., a styrene series resin such as acrylonitrile•styrene resin (AS resin), acrylonitrile•butadiene•styrene resin (ABS resin), etc., a butadiene series resin such as acrylonitrile•butadiene resin (AB resin), etc., a (meth)acrylic series resin such as polymethyl(meth)acrylate resin (PM(M)A resin), etc., a polyolefin series resin such as polyethylene resin, polypropylene resin, etc., a polycarbonate series resin, and the like.

A thickness of the filter substrate is preferably 0.5 mm or more and 10 mm or less, more preferably 1 mm or more and 3 mm or less. If the thickness of the filter substrate is lower than the preferred range, there is a fear that deformation or breakage of the filter substrate will occur. On the other hand, if the thickness of the filter substrate exceeds the preferred range, a number of the filters contained in the humidifier per unit volume are decreased, so that there is a fear that sufficient humidifying characteristics cannot be obtained.

The anchor layer is interposed between the filter substrate and the hydrophilic layer, and is to heighten adhesiveness between the filter substrate and the hydrophilic layer. Moreover, by having the anchor layer, strength of the hydrophilic layer itself is improved, so that high humidifying characteristics can be maintained for a long period of time. Also, when scales are attached to the surface of the filter, even when the scales are removed by washing with water, the humidifying characteristics are not substantially changed and can be utilized again thereafter.

In the anchor layer, a film-forming polymer is to be contained. A ratio of the film-forming polymer to be contained in the anchor layer is preferably 85% by weight or more, more preferably 90% by weight or more based on the total weight of the solid component of the anchor layer. There is no specific upper limit of the preferred ratio of the content, and it may comprise 100% by weight, that is, the anchor layer may comprise a film-forming polymer alone. If it is less than the preferred ratio of the content, there is a fear that adhesiveness between the anchor layer and the filter substrate may be sometimes inferior.

Specific examples of the film-forming polymer is mentioned, for example, a polyvinyl alcohol resin, polyurethane resin, polyethylene resin, polyester resin, poly-styrene resin, epoxy resin, vinyl acetate resin, poly(meth)acrylic acid resin, (meth)-acrylate resin, (meth)acrylic acid•styrene copolymer resin, ethylene•vinyl acetate copolymer resin, vinyl acetate•(meth)acrylate copolymer resin, ethylene•vinyl acetate•(meth)acrylate ternary copolymer resin, etc. Since the vaporization filter of the present invention is used by dipping in water for a long period of time, a butadiene series resin or styrene series resin which are difficulty hydrolyzable or swellable such as an acrylonitrile•butadiene resin (AB resin), styrene•butadiene resin (SB resin), acrylonitrile•butadiene•styrene resin (ABS resin), acrylate•styrene copolymer resin, methacrylate•styrene copolymer resin, etc. are more preferred. These film-forming polymers may be used singly, or in admixture by mixing a plural number thereof.

In the anchor layer, a functional agent such as an antibacterial agent, an anti-mildew agent, a deodorizer, a catalyst, a coloring agent, etc., may be contained in the range which does not inhibit the effects thereof.

A thickness of the anchor layer is preferably 0.01 μm or more and 20 μm or less. If it is less than 0.01 μm, there is a fear that adhesiveness between the anchor layer and the hydrophilic layer cannot be obtained. On the other hand, if it exceeds 20 μm, an anchor layer having a plane surface can be hardly obtained, and as a result, a hydrophilic layer to be provided on the anchor layer is also difficulty formed with a plane surface, whereby a water layer can be hardly formed thereon and there is a fear that the humidification efficiency are lowered.

To prepare an anchor layer, a coating solution for forming an anchor layer containing a film-forming polymer is firstly prepared. The film-forming polymer is used, in many cases, in the coating solution for an anchor layer as an emulsion or a dispersion using water as a medium. When a functional agent is to be contained in the anchor layer depending on necessity, the functional agent may be contained in the coating solution for an anchor layer as a solution or dispersion. The anchor layer can be prepared, for example, by the method in which a filter substrate is immersed in a coating solution for an anchor layer, taken out and dried. According to this method, the anchor layer can be formed on the both surfaces of the filter substrate simultaneously. A series of steps of immersing, taking out and drying may be carried out repeatedly with a plural number of times, and when the procedure is carried out repeatedly, the compositions of the respective coating solutions may be different from each other. In addition to the immersing method, the anchor layer may be provided by the roller coating method, brush coating method, spray coating method, etc.

To improve coating suitability of the anchor layer on to the filter substrate, a surfactant may be used in combination. As the surfactant, there may be used a surfactant, for example, a carboxylic acid series, sulfonic acid series, sulfate series, higher alcohol series, glycerin fatty acid ester series, polyoxyethylene alkyl ether series, fatty acid polyethylene glycol series, acetylene diol series, etc. A kind of the surfactant can be optionally selected in view of the composition of the film-forming polymer, etc., and can be used each singly or in combination of a plural number of the materials.

The hydrophilic layer is excellent in hydrophilicity and is to be provided for the purpose of forming a water layer on the surface layer of the vaporization filter at the time of operating a humidifier. The hydrophilic layer can be provided, for example, by the method of making the surface of the anchor layer hydrophilic by the surfactant treatment, discharge treatment, graft treatment, etc. According to the method in which a hydrophilic layer containing a hydrophilic material is provided, a hydrophilic layer having durability with a long term can be provided. As the hydrophilic material, there may be mentioned hydrophilic fine particles, hydrophilic film-forming polymer, etc. These hydrophilic materials have a functional group(s) having polarity such as a hydroxyl group, carboxyl group, sulfonic acid group, amino group, amide group, carbonyl group, ester bond, etc., it is possible to maintain water chemically attracted by these functional groups at the surface of the hydrophilic layer.

The hydrophilic layer preferably contains fine particles. The fine particles may be either organic fine particles or inorganic fine particles. With regard to voids at the inside of the fine particles, it may be either of the types such as fine particles having no voids at the inside thereof, hollow fine particles, hollow fine particles having an opening, porous fine particles, etc. When the fine particles have voids, it is possible to effectively maintain water in the voids, and humidification efficiency can be improved. Also, even when the fine particles have no void, extremely minute pores mentioned below are likely formed by agglomeration of fine particles with each other, whereby water can be retained effectively, and humidification efficiency can be improved.

Specific examples of the organic fine particles may be mentioned polystyrene series fine particles, styrene•acryl series fine particles, styrene•butadiene series fine particles, acrylate series fine particles, Nylon series fine particles, etc. It may be the so-called core-shell type fine particles in which the composition is different at the surface portion and the core of the fine particles. Specific examples of the inorganic fine particles may be mentioned kaolin, talc, calcium sulfate, barium sulfate, titanium dioxide, zinc oxide, zinc sulfide, zinc carbonate, satin white, aluminum silicate, diatomaceous earth, calcined diatomaceous earth, calcium silicate, magnesium silicate, lithopone, zeolite, hydrated halloysite, magnesium carbonate, magnesium hydroxide, silica gel, colloidal silica, fumed silica, wet silica, alumina, colloidal alumina, aluminum hydroxide, etc. Two or more kinds of fine particles may be used in combination. Hydrophilic fine particles can be preferably used to improve hydrophilicity, and specific examples thereof are preferably mentioned silica gel, colloidal silica, fumed silica, wet silica, alumina, colloidal alumina and aluminum hydroxide.

A volume average particle size (primary particle size) of the fine particles is preferably 4 nm or more and 500 nm or less, more preferably 4 nm or more and 100 nm or less. It is difficult to produce fine particles having a volume average particle size of less than 4 nm. If the volume average particle size exceeds 500 nm, bonding forces of the fine particles are lowered and water-and-scratch resistance is lowered, so that there is a fear that fine particles may be peeled off when the filter substrate is washed or when the filter substrate is used for a long period of term.

A binder is preferably contained in the hydrophilic layer in addition to the fine particles, whereby prevention from peeling of the fine particles or improvement in adhesiveness with the anchor layer can be realized. As the binder, there may be mentioned an inorganic binder such as silica sol, alumina sol, titania sol, sodium silicate and hydrolyzate of a silicate compound, and a film-forming polymer, etc. Of these, a film-forming polymer is preferably used since further effects can be obtained in preventing from peeling of the fine particles or improvement in adhesiveness.

As the film-forming polymer to be used as a binder for the hydrophilic layer, there may be used a polyvinyl alcohol resin, polyurethane resin, polyethylene resin, polyester resin, polystyrene resin, epoxy resin, vinyl acetate resin, poly(meth)acrylic acid resin, poly(meth)acrylate resin, (meth)acrylic acid•styrene copolymer resin, ethylene•vinyl acetate copolymer resin, vinyl acetate•(meth)acrylate copolymer resin, ethylene•vinyl acetate•(meth)acrylate ternary copolymer resin, etc. Of these, preferred are butadiene series resin, styrene series resin, etc., which are hydrophilic and difficulty hydrolyzable or swellable such as an acrylonitrile•butadiene resin (AB resin), styrene•-butadiene resin (SB resin), acrylonitrile•butadiene•styrene resin (ABS resin), acrylate•-styrene copolymer resin, methacrylate•styrene copolymer resin, etc. Also, two or more kinds of binders may be used in combination.

In the hydrophilic layer, a contained ratio of the fine particles is preferably 20% by weight or more and 95% by weight or less, more preferably 30% by weight or more and 90% by weight or less, further preferably 35% by weight or more and 85% by weight or less based on the total weight of the solid components of the hydrophilic layer. Also, in the hydrophilic layer, a contained ratio of the binder is preferably 5% by weight or more and 80% by weight or less, more preferably 10% by weight or more and 70% by weight or less, further preferably 15% by weight or more and 65% by weight or less. If the content of the fine particles is less than 30% by weight, a phenomenon that humidification efficiency of the filter are lowered can be sometimes admitted, while if it is less than 20% by weight, the phenomenon can be more significantly admitted. Also, when the content of the fine particles exceeds 90% by weight, a phenomenon that adhesiveness of the hydrophilic layer and the anchor layer is lowered or fine particles in the hydrophilic layer are peeled off can be sometimes admitted, while if it exceeds 95% by weight, the phenomenon can be more significantly admitted.

Also, a functional agent such as an antibacterial agent, an anti-mildew agent, a deodorizer, a catalyst, a coloring agent, etc., may be contained in the range which does not inhibit the effects of the hydrophilic layer.

For the purpose of improving strength of the hydrophilic layer, the hydrophilic layer is preferably cross-linked, and a cross-linking agent is preferably contained in the hydrophilic layer. According to the fine particles and/or the binder and the cross-linking agent contained in the hydrophilic layer, cross-linked structure is formed. As the cross-linking agent, there may be used boric acid, aldehyde series compound, ketone series compound, triazine series compound, carbodiimide series compound, epoxy series compound, isocyanate series compound, melamine series compound, etc. In particular, when inorganic fine particles are used in the hydrophilic layer, an organic silicon compound such as a silane coupling agent, etc., is preferably used.

Specific examples of the silane coupling agent may be mentioned, for example, vinyltrimethoxysilane, vinyltriethoxysilane, 2-(3,4-epoxycyclohexyl)ethyltrimethoxysilane, allyltrimethoxysilane, allyltriethoxysilane, diethoxymethylvinylsilane, 3-glycidoxypropyltriethoxysilane, 3-glycidoxypropylmethyldiethoxysilane, 3-glycidyl-oxypropyl(dimethoxy)methylsilane, diethoxy(3-glycidyloxypropyl)methylsilane, 3-glycidoxypropyltriethoxysilane, p-styryltrimethoxysilane, 3-methacryloxypropylmethyldimethoxysilane, 3-methacryloxypropyltrimethoxysilane, 3-methacryloxy-propylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyldimethoxymethylsilane, 3-aminopropyldiethoxymethylsilane, 3-triethoxysilyl-N-(1,3-dimethyl-butylidene)-propylamine, 3-(2-aminoethylamino)propyltriethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, etc.

A content of said cross-linking agent to be contained is preferably 0.05% by weight or more and 5.0% by weight or less, more preferably 0.1% by weight or more and 3.0% by weight or less based on the total weight of the sold component of the hydrophilic layer. If the content of the cross-linking agent is less than 0.05% by weight, strength of the hydrophilic layer may be sometimes the same as the case where no cross-linking agent is added.

If the content of the cross-linking agent exceeds 5.0% by weight, a coating solution for the hydrophilic layer mentioned below is likely solidified, and there is a fear that production of the hydrophilic layer is difficult.

A thickness of the hydrophilic layer is preferably 0.3 μm or more and 9.0 μm or less, more preferably 0.5 μm or more and 8.0 μm or less, further preferably 1.0 μm or more and 7.5 μm or less. If the thickness of the hydrophilic layer is less than 0.3 μm, hydrophilicity of the surface of the hydrophilic layer is lowered, and there is a fear of lowering humidification efficiency. On the other hand, even when a hydrophilic layer exceeding 9.0 μm is provided, not only further improvement in humidification efficiency cannot be expected, but also an amount of scales attached to the hydrophilic layer with a lapse of time becomes large, and there is a fear that hydrophilicity is inhibited.

Figure 2:
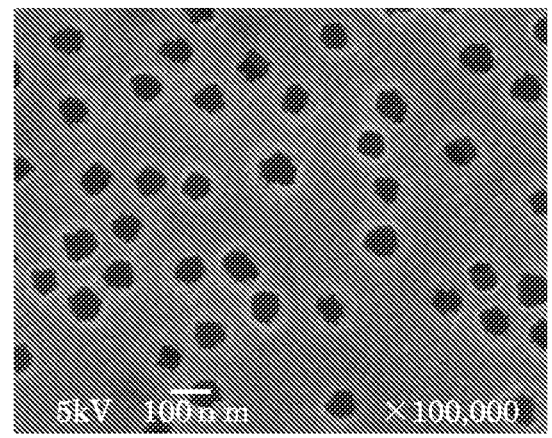
FIG. 2 This is an electron microscopic photograph showing one example of a surface of a hydrophilic layer of the vaporization filter for humidification of the present invention.

In the present invention, a water layer is formed on the surface of the hydrophilic layer, whereby humidification can be effectively carried out. The water layer is formed at the portion of the surface of the hydrophilic layer to which water is supplied. It is preferred that a continuous water layer is formed on the whole surface of the hydrophilic layer, and there may partially exist a portion(s) in which no water layer is formed on the hydrophilic surface so long as it does not inhibit the humidification efficiency. To form a water layer on the surface of the hydrophilic layer, it would be important that pores do never exist at the surface of the hydrophilic layer, or even when a pore(s) exists at the same, the pore(s) should be an extremely minute size. FIG. 2 is an electron microscopic photograph of the vaporization filter according to the present invention having an extremely minute sized pore(s) on the surface of the hydrophilic layer. The extremely minute sized pore(s) can effectively maintain water, and can improve humidification efficiency more effectively. An average surface area of the extremely minute sized pore(s) is preferably 0.1 $\mu m^2$ or less, more preferably 0.01 $\mu m^2$ or less. If the surface area of the pore(s) exceeds 0.1 $\mu m^2$, water goes into the pore(s), so that efficiency of evaporating and drying water from the water layer at the time of passing dried air thereon is lowered, and there is a fear of lowering in humidification efficiency. In addition, scales are likely accumulated into the pore(s), or the hydrophilic layer is likely deteriorated from the edge of the pore(s), whereby there is a fear of causing a problem in long term durability in view of humidification efficiency. As described above, in the present invention, the surface of the hydrophilic layer may be a state of having no pore, so that a lower limit of the average surface area of the extremely minute sized pore(s) is not particularly mentioned. Incidentally, water retained in large sized pores of 1 to 3 $\mu m^2$ formed at the surface of a vaporization filter by particles described in JP 2007-198685A, or water retained in voids of a foamy shaped substrate described in JP 2007-198685A or JP 2005-315554A does not constitute a hydrophilic layer surface, but water maintained at the inside of the hydrophilic layer, so that they do not comply with the "water layer" of the present invention.

To prepare a hydrophilic layer comprising a hydrophilic material, a coating solution for a hydrophilic layer comprising various kinds of hydrophilic materials and a cross-linking agent(s) may be prepared. The functional agent to be contained in the hydrophilic layer depending on necessity may be contained in the coating solution for a hydrophilic layer as a solution or dispersion. The hydrophilic layer can be prepared, for example, by immersing a filter substrate provided by an anchor layer in a coating solution for a hydrophilic layer, taking out and drying. According to this method, hydrophilic layers can be provided on the both surfaces of the filter substrate both surfaces of which had been provided by anchor layers, simultaneously. A series of steps of immersing, taking out and drying may be carried out repeatedly with a plural number of times, and when the procedure is carried out repeatedly, the compositions of the respective coating solutions may be different from each other. In addition to the immersing method, the hydrophilic layer may be provided by the roller coating method, brush coating method, spray coating method, etc.

In the coating solution for a hydrophilic layer, a surfactant may be used to improve coating suitability to the anchor layer. As the surfactant, there may be contained a surfactant, for example, a carboxylic acid series, sulfonic acid series, sulfate series, higher alcohol series, glycerin fatty acid ester series, polyoxyethylene alkyl ether series, fatty acid polyethylene glycol series, acetylene diol series, etc. A kind of the surfactant can be optionally selected in view of the kind of the hydrophilic material or ionic property, etc.

Figure 3:
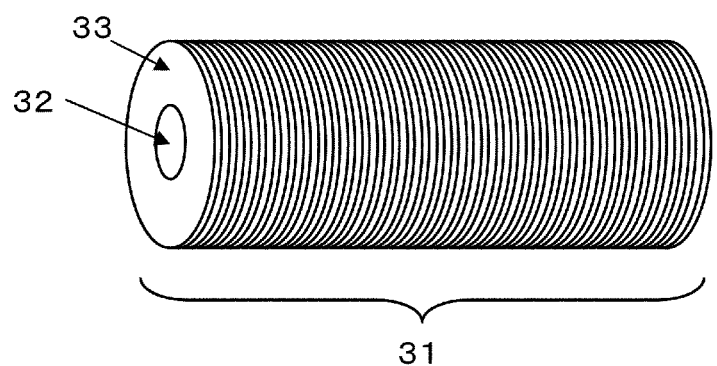
FIG. 3 This is an outline view showing one example of a filter laminate for humidification of the present invention.

Next, the humidification method by the vaporization filter for humidification of the present invention is explained. When water is supplied to the vaporization filter (in the following, when the vaporization filter comprises 1 sheet, it is also called to as "filter single plate"), a water layer is formed at the surface layer of the filter single plate, and the water is vaporized to humidify the dry air. In order to improve humidification efficiency, it is preferred that the filter single plates are filled per a unit volume as much as possible. A filter laminate for humidification of the present invention is constituted by laminating a plural number of the filter single plates with a distance, and preferably used is a method in which dry air is passed through a gap(s) between the filter single plates to carry out humidification. For example, as shown in FIG. 3, there is a method in which a plural number of circular-shaped filter single plates 33 are laminated with a constant distance, whereby a cylindrical-shaped filter laminate 31 is constituted. In FIG. 3, the filter single plate 33 has an opening portion 32 at the center portion, and an axle is inserted into the opening portion 32 whereby the filter laminate 31 can be rotated. A number of the filter single plate to be laminated can be optionally determined depending on the humidification efficiency to be obtained. Also, there is no particular limitation about a distance between the filter single plates to be laminated, and the distances may all be the constant or may be different from each other.

Figure 4:
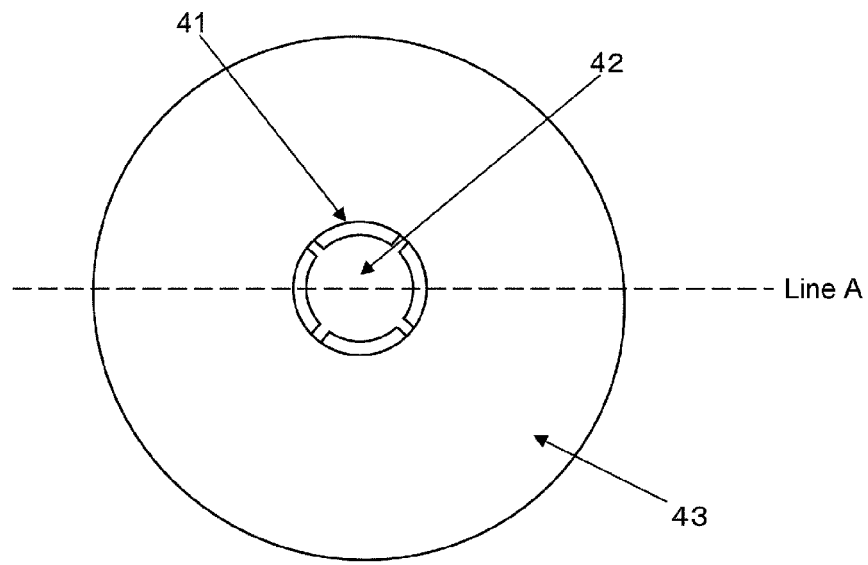
FIG. 4 This is an upper outline view showing one example of filter substrate.
Figure 5:
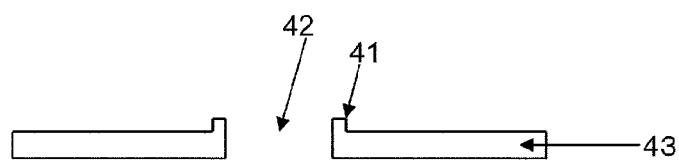
FIG. 5 This is a sectional outline view at line A of FIG. 4.

As a means to provide a distance between the filter single plates adjacent to each other in the filter laminate, there may be mentioned a method of providing a bump (difference between steps) having a certain height at one side or both sides of a filter substrate. FIG. 4 and FIG. 5 are outline views of filter substrates 43 having an opening portion 42 at the center portion thereof and having been provided a bump 41 at the periphery thereof. The height of the bump 41 is a distance between the filter single plates of the filter laminate. When the height thereof is made constant, lamination distance between the filter single plates is constant.

Figure 6:
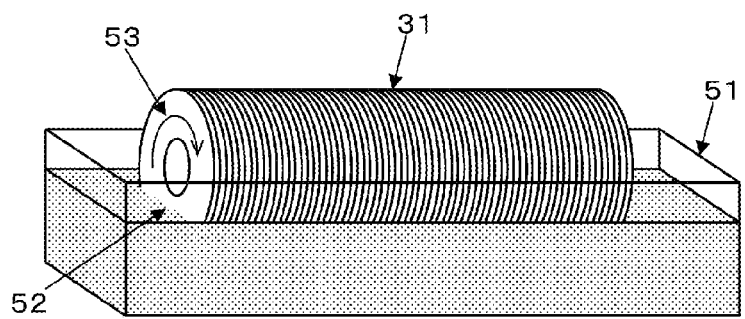
FIG. 6 This is an outline view showing one example of dipping a filter laminate in water bath and rotating the same.

FIG. 6 shows an example of a method of supplying water to the filter laminate 31. The filter laminate 31 is dipped in a water tank 51 so that parts of the filter laminate 31 sink below the water surface 52. In FIG. 6, the bottom portion of the cylindrical-shaped filter laminate 31 fallen sideways sinks under the water surface 52. By rotating the center of the filter laminate 31 as the axis of rotation at the time of operating a humidifier, water is continuously supplied to the whole surface of the filter laminate 31, and a water layer is formed at the surface of the hydrophilic layer. The axis of rotation is generally perpendicular to the widest surface of the filter. Dry air is humidified by contacting the dry air to the filter laminate 31 at the upper portion of the water surface 52.

EXAMPLES

In the following, the present invention will be explained in more detail by referring to Examples, but the present invention is not limited by these Examples. In the following, all part(s) or % are based on a weight. Also, a number of parts of an aqueous solution, emulsion, dispersion, etc., describes a numerical value calculated on a weight of the solid component. The primary particle size of fine particles used in Examples is a value mentioned in the brochure.

Example 1

<Preparation of Filter Substrate>

A circular resin plate 43 having a shape shown in FIG. 4 and FIG. 5 and comprising an acrylonitrile•butadiene•styrene resin was prepared by an injection molding. The circular resin plate has a thickness of 1.7 mm, a diameter of 90 mm and has an opening portion 42 at the center portion with a diameter of 14 mm Then, at one surface of the circular resin plate, a bump 41 with a height of 1.8 mm was provided at the peripheral of the opening portion 42. This circular resin plate 43 is made a filter substrate 1.

<Preparation of a Coating Solution for an Anchor Layer>

Water was added to an acrylonitrile•butadiene resin (available from Zeon Corporation, trade name: Nippol 1561, 40.5% liquid) under stirring so as to have a concentration of the solid content of the coating solution of 12.5% to prepare a coating solution for an anchor layer 1.

<Preparation of Coating Solution for Hydrophilic Layer>

The materials shown in Table 1 were mixed by a stirrer to prepare a coating solution for a hydrophilic layer 1.

TABLE 1

| | |
|---|---|
| Colloidal silica (available from Nissan Chemical Industries, Ltd., trade name: SNOWTEX O, 20% solution, primary particle size: 10 to 20 nm) | 70 parts |
| Acrylonitrile•butadiene resin (available from Zeon Corporation, trade name: Nippol 1561, 40.5% solution) | 30 parts |
| Silane coupling agent (3-aminopropyldimethoxymethylsilane) | 1 part |

<Preparation of Filter Single Plate>

After the filter substrate 1 was immersed in the coating solution for an anchor layer 1 and taken out, it was dried to prepare an anchor layer-coated product. After the anchor layer-coated product was immersed in the coating solution for a hydrophilic layer 1 and taken out, it was dried to prepare a filter single plate 1.

<Preparation of Filter Laminate>

51 sheets of the filter single plates 1 were laminated to prepare a filter laminate 1. A bump 11 with a height of 1.8 mm provided to the filter single plate has a role of a spacer, so that the filter single plates 1 are laminated, then, there is a gap of 1.8 mm between the filter single plates. And air can pass through the gaps. Also, by inserting an axle into the opening portions provided at the center portions of the filter single plates 1, the filter laminate 1 can be fixed without slippage.

Example 2

The materials shown in Table 2 were mixed by a stirrer to prepare a coating solution for a hydrophilic layer 2. A filter laminate 2 was prepared in the same manner as in Example 1 except for changing the coating solution for a hydrophilic layer 1 to a coating solution for a hydrophilic layer 2.

TABLE 2

| | |
|---|---|
| Colloidal silica (available from Nissan Chemical Industries, Ltd., trade name: SNOWTEX O-40, 40% solution, primary particle size: 10 to 20 nm) | 70 parts |
| Acrylonitrile•butadiene resin (available from Zeon Corporation, trade name: Nippol 1561, 40.5% solution) | 30 parts |
| Silane coupling agent (3-aminopropyldimethoxymethylsilane) | 1 part |

Example 3

To the coating solution for a hydrophilic layer 1 was added water to dilute the same twice to prepare a coating solution for a hydrophilic layer 3. A filter laminate 3 was prepared in the same manner as in Example 1 except for changing the coating solution for a hydrophilic layer 1 to a coating solution for a hydrophilic layer 3.

Example 4

The materials shown in Table 3 were mixed by a stirrer to prepare a coating solution for a hydrophilic layer 4. A filter laminate 4 was prepared in the same manner as in Example 1 except for changing the coating solution for a hydrophilic layer 1 to a coating solution for a hydrophilic layer 4.

TABLE 3

| | |
|---|---|
| Colloidal silica (available from Nissan Chemical Industries, Ltd., trade name: SNOWTEX O, 20% solution, primary particle size: 10 to 20 nm) | 60 parts |
| Acrylonitrile•butadiene resin (available from Zeon Corporation, trade name: Nippol 1561, 40.5% solution) | 40 parts |
| Silane coupling agent (3-aminopropyldimethoxymethylsilane) | 1 part |

Example 5

The materials shown in Table 4 were mixed by a stirrer to prepare a coating solution for a hydrophilic layer 5. A filter laminate 5 was prepared in the same manner as in Example 1 except for changing the coating solution for a hydrophilic layer 1 to a coating solution for a hydrophilic layer 5.

TABLE 4

| | |
|---|---|
| Colloidal silica (available from Nissan Chemical Industries, Ltd., trade name: SNOWTEX O, 20% solution, primary particle size: 10 to 20 nm) | 80 parts |
| Acrylonitrile•butadiene resin (available from Zeon Corporation, trade name: Nippol 1561, 40.5% solution) | 20 parts |
| Silane coupling agent (3-aminopropyldimethoxymethylsilane) | 1 part |

Example 6

The materials shown in Table 5 were mixed by a stirrer to prepare a coating solution for a hydrophilic layer 6. A filter laminate 6 was prepared in the same manner as in Example 1 except for changing the coating solution for a hydrophilic layer 1 to a coating solution for a hydrophilic layer 6.

TABLE 5

| | |
|---|---|
| Colloidal silica (available from Nissan Chemical Industries, Ltd., trade name: SNOWTEX O, 20% solution, primary particle size: 10 to 20 nm) | 70 parts |
| Acrylonitrile•butadiene resin (available from Zeon Corporation, trade name: Nippol 1561, 40.5% solution) | 30 parts |

Example 7

The materials shown in Table 6 were mixed by a stirrer to prepare a coating solution for a hydrophilic layer 7. A filter laminate 7 was prepared in the same manner as in Example 1 except for changing the coating solution for a hydrophilic layer 1 to a coating solution for a hydrophilic layer 7.

TABLE 6

| | |
|---|---|
| Colloidal silica (available from Nissan Chemical Industries, Ltd., trade name: SNOWTEX O-40, 40% solution, primary particle size: 10 to 20 nm) | 70 parts |
| Acrylonitrile•butadiene resin (available from Zeon Corporation, trade name: Nippol 1561, 40.5% solution) | 30 parts |

Example 8

The materials shown in Table 7 were mixed by a stirrer to prepare a coating solution for a hydrophilic layer 8. A filter laminate 8 was prepared in the same manner as in Example 1 except for changing the coating solution for a hydrophilic layer 1 with a coating solution for a hydrophilic layer 8.

TABLE 7

| | |
|---|---|
| Colloidal silica (available from Nissan Chemical Industries, Ltd., trade name: SNOWTEX O, 20% solution, primary particle size: 10 to 20 nm) | 60 parts |
| Acrylonitrile•butadiene resin (available from Zeon Corporation, trade name: Nippol 1561, 40.5% solution) | 40 parts |

Example 9

<Preparation of Coating Solution for Anchor Layer>

To a styrene•methacrylate copolymer resin (available from Showa Highpolymer Co., Ltd., trade name: AP-4750N, 47% solution) was added water under stirring so as to become a concentration of the solid content in the coating solution 12.5%, to prepare a coating solution for an anchor layer 2.

<Preparation of Coating Solution for Hydrophilic Layer>

The materials shown in Table 8 were mixed by a stirrer to prepare a coating solution for a hydrophilic layer 9.

TABLE 8

| | |
|---|---|
| Colloidal silica (available from Nissan Chemical Industries, Ltd., trade name: SNOWTEX O, 20% solution, primary particle size: 10 to 20 nm) | 70 parts |
| Styrene•methacrylate copolymer resin (available from Showa Highpolymer Co., Ltd., trade name: AP-4750N, 47% solution) | 30 parts |
| Silane coupling agent (3-aminopropyldimethoxymethylsilane) | 1 part |

<Preparation of Filter Laminate>

A filter laminate 9 was prepared in the same manner as in Example 1 except for changing the coating solution for the anchor layer 1 to a coating solution for the anchor layer 2, and changing the coating solution for the hydrophilic layer 1 to a coating solution for a hydrophilic layer 9.

Example 10

The materials shown in Table 9 were mixed by a stirrer to prepare a coating solution for a hydrophilic layer 10. A filter laminate 10 was prepared in the same manner as in Example 1 except for changing the coating solution for a hydrophilic layer 1 to a coating solution for a hydrophilic layer 10.

TABLE 9

| | |
|---|---|
| Polyvinyl alcohol (available from KURARAY CO., LTD., trade name: PVA235) | 8 parts |
| Water | 92 parts |
| Boric acid | 2 parts |

Example 11

The materials shown in Table 10 were mixed by a stirrer to prepare a coating solution for a hydrophilic layer 11. A filter laminate 11 was prepared in the same manner as in Example 1 except for changing the coating solution for a hydrophilic layer 1 to a coating solution for a hydrophilic layer 11.

TABLE 10

| | |
|---|---|
| Colloidal silica (available from Nissan Chemical Industries, Ltd., trade name: SNOWTEX O, 20% solution, primary particle size: 10 to 20 nm) | 90 parts |
| Acrylonitrile•butadiene resin (available from Zeon Corporation, trade name: Nippol 1561, 40.5% solution) | 10 parts |
| Silane coupling agent (3-aminopropyldimethoxymethylsilane) | 1 part |

Example 12

The materials shown in Table 11 were mixed by a stirrer to prepare a coating solution for a hydrophilic layer 12. A filter laminate 12 was prepared in the same manner as in Example 1 except for changing the coating solution for a hydrophilic layer 1 to a coating solution for a hydrophilic layer 12.

TABLE 11

| | |
|---|---|
| Colloidal silica (available from Nissan Chemical Industries, Ltd., trade name: SNOWTEX O, 20% solution, primary particle size: 10 to 20 nm) | 93 parts |
| Acrylonitrile•butadiene resin (available from Zeon Corporation, trade name: Nippol 1561, 40.5% solution) | 7 parts |
| Silane coupling agent (3-aminopropyldimethoxymethylsilane) | 1 part |

Example 13

The materials shown in Table 12 were mixed by a stirrer to prepare a coating solution for a hydrophilic layer 13. A filter laminate 13 was prepared in the same manner as in Example 1 except for changing the coating solution for a hydrophilic layer 1 to a coating solution for a hydrophilic layer 13.

TABLE 12

| | |
|---|---|
| Colloidal silica (available from Nissan Chemical Industries, Ltd., trade name: SNOWTEX O, 20% solution, primary particle size: 10 to 20 nm) | 40 parts |
| Acrylonitrile•butadiene resin (available from Zeon Corporation, trade name: Nippol 1561, 40.5% solution) | 60 parts |
| Silane coupling agent (3-aminopropyldimethoxymethylsilane) | 1 part |

Example 14

The materials shown in Table 13 were mixed by a stirrer to prepare a coating solution for a hydrophilic layer 14. A filter laminate 14 was prepared in the same manner as in Example 1 except for changing the coating solution for a hydrophilic layer 1 to a coating solution for a hydrophilic layer 14.

TABLE 13

| | |
|---|---|
| Colloidal silica (available from Nissan Chemical Industries, Ltd., trade name: SNOWTEX O, 20% solution, primary particle size: 10 to 20 nm) | 30 parts |
| Acrylonitrile•butadiene resin (available from Zeon Corporation, trade name: Nippol 1561, 40.5% solution) | 70 parts |
| Silane coupling agent (3-aminopropyldimethoxymethylsilane) | 1 part |

Example 15

The materials shown in Table 14 were mixed by a stirrer to prepare a coating solution for a hydrophilic layer 15. A filter laminate 15 was prepared in the same manner as in Example 1 except for changing the coating solution for a hydrophilic layer 1 to a coating solution for a hydrophilic layer 15.

TABLE 14

| | |
|---|---|
| Colloidal silica (available from Nissan Chemical Industries, Ltd., trade name: SNOWTEX O, 20% solution, primary particle size: 10 to 20 nm) | 28 parts |
| Acrylonitrile•butadiene resin (available from Zeon Corporation, trade name: Nippol 1561, 40.5% solution) | 72 parts |
| Silane coupling agent (3-aminopropyldimethoxymethylsilane) | 1 part |

Example 16

<Preparation of Coating Solution for Anchor Layer>

Water was added to an acrylonitrile•butadiene•styrene resin (available from Nippon A&L Inc., trade name: SR-142, 48.0% solution) under stirring to have a concentration of the solid content of the coating solution of 12.5% to prepare a coating solution for an anchor layer 3.

<Preparation of Coating Solution for Hydrophilic Layer>

The materials shown in Table 15 were mixed by a stirrer to prepare a coating solution for a hydrophilic layer 16.

TABLE 15

| | |
|---|---|
| Colloidal silica (available from Nissan Chemical Industries, Ltd., trade name: SNOWTEX O, 20% solution, primary particle size: 10 to 20 nm) | 70 parts |
| Acrylonitrile•butadiene.styrene resin (available from Nippon A&L Inc., trade name: SR-142, 48.0% solution) | 30 parts |
| Silane coupling agent (3-aminopropyldimethoxymethylsilane) | 1 part |

<Preparation of Filter Laminate>

A filter laminate 16 was prepared in the same manner as in Example 1 except for changing the coating solution for an anchor layer 1 to a coating solution for an anchor layer 3 and changing the coating solution for a hydrophilic layer 1 to a coating solution for a hydrophilic layer 16.

Example 17

<Preparation of Coating Solution for Anchor Layer>

Water was added to a styrene•butadiene resin (available from Nippon A&L Inc., trade name: SR-101, 52.0% solution) under stirring to have a concentration of the solid content of the coating solution of 12.5% to prepare a coating solution for an anchor layer 4.

<Preparation of Coating Solution for Hydrophilic Layer>

The materials shown in Table 16 were mixed by a stirrer to prepare a coating solution for a hydrophilic layer 17.

TABLE 16

| | |
|---|---|
| Colloidal silica (available from Nissan Chemical Industries, Ltd., trade name: SNOWTEX O, 20% solution, primary particle size: 10 to 20 nm) | 70 parts |
| Styrene•butadiene resin (available from Nippon A&L Inc., trade name: SR-101, 52.0% solution) | 30 parts |
| Silane coupling agent (3-aminopropyldimethoxymethylsilane) | 1 part |

<Preparation of Filter Laminate>

A filter laminate 17 was prepared in the same manner as in Example 1 except for changing the coating solution for an anchor layer 1 to a coating solution for an anchor layer 4 and changing the coating solution for a hydrophilic layer 1 to a coating solution for a hydrophilic layer 17.

Example 18

The materials shown in Table 17 were mixed by a stirrer to prepare a coating solution for a hydrophilic layer 18. A filter laminate 18 was prepared in the same manner as in Example 1 except for changing the coating solution for a hydrophilic layer 1 to a coating solution for a hydrophilic layer 18.

TABLE 17

| | |
|---|---|
| Colloidal silica (available from Nissan Chemical Industries, Ltd., trade name: SNOWTEX O, 20% solution, primary particle size: 10 to 20 nm) | 70 parts |
| Polyacrylate resin (available from Showa Highpolymer Co., Ltd., trade name: PSA SE-1700, 50.0% solution) | 30 parts |
| Silane coupling agent (3-aminopropyldimethoxymethylsilane) | 1 part |

Example 19

The materials shown in Table 18 were mixed by a stirrer to prepare a coating solution for a hydrophilic layer 19. A filter laminate 19 was prepared in the same manner as in Example 1 except for changing the coating solution for a hydrophilic layer 1 to a coating solution for a hydrophilic layer 19.

TABLE 18

| | |
|---|---|
| Colloidal silica (available from Nissan Chemical Industries, Ltd., trade name: SNOWTEX MP-4540M, 40% solution, primary particle size 420 to 480 nm) | 70 parts |
| Acrylonitrile•butadiene resin (available from Zeon Corporation, trade name: Nippol 1561, 40.5% solution) | 30 parts |
| Silane coupling agent (3-aminopropyldimethoxymethylsilane) | 1 part |

Example 20

The materials shown in Table 19 were mixed by a stirrer to prepare a coating solution for a hydrophilic layer 20. A filter laminate 20 was prepared in the same manner as in Example 1 except for changing the coating solution for a hydrophilic layer 1 to a coating solution for a hydrophilic layer 20.

TABLE 19

| | |
|---|---|
| Colloidal silica (available from Nissan Chemical Industries, Ltd., trade name: SNOWTEX XS, 20% solution, primary particle size 4 to 6 nm) | 70 parts |
| Acrylonitrile•butadiene resin (available from Zeon Corporation, trade name: Nippol 1561, 40.5% solution) | 30 parts |
| Silane coupling agent (3-aminopropyldimethoxymethylsilane) | 1 part |

Example 21

<Preparation of Filter Single Plate>

A filter laminate 21 was prepared in the same manner as in Example 1 except that the anchor layer-coated product 1 was immersed in the coating solution for a hydrophilic layer 1, taken out and dried, and then, immersed again in the coating solution for a hydrophilic layer 1, taken out and dried.

Example 22

Water was added to the coating solution for a hydrophilic layer 1 to dilute it three-times to prepare a coating solution for a hydrophilic layer 21. A filter laminate 22 was prepared in the same manner as in Example 1 except for changing the coating solution for a hydrophilic layer 1 to the coating solution for a hydrophilic layer 21.

Example 23

Water was added to the coating solution for a hydrophilic layer 1 to dilute it 3.5-times to prepare a coating solution for a hydrophilic layer 22. A filter laminate 23 was prepared in the same manner as in Example 1 except for changing the coating solution for a hydrophilic layer 1 to the coating solution for a hydrophilic layer 22.

Example 24

<Preparation of Filter Single Plate>

A filter substrate 1 was immersed in the coating solution for an anchor layer 1, taken out and dried to prepare an anchor layer-coated product. A filter laminate 24 was prepared in the same manner as in Example 1 except that the anchor layer-coated product was immersed in the coating solution for a hydrophilic layer 2, taken out and dried to prepare a hydrophilic layer-coated product 2, and the product was further immersed in the coating solution for a hydrophilic layer 3, taken out and dried.

Comparative Example 1

A filter laminate I was prepared in the same manner as in Example 1 except for directly providing a hydrophilic layer on the filter substrate 1 without coating an anchor layer.

Comparative Example 2

A filter laminate II was prepared in the same manner as in Example 1 except for using the filter substrate 1 as such.

Comparative Example 3

A polyurethane foam with a thickness of 1.7 mm and having a three-dimensional network structure was drafted by a trimming die having a circle shape with a diameter of 90 mm and having an opening portion at the center portion with a diameter of 14 mm to prepare a polyurethane foam plate 1. An aluminum plate with a thickness of 1.8 mm was drawn as the same shape of the bump of the filter substrate 1 used in Example 1, and laminated by overlapping the opening portions of the polyurethane foam plates as a means to provide gaps between the filter substrates to prepare a filter substrate 2. By using the coating solution for a hydrophilic layer 1, a hydrophilic layer was directly provided on the filter substrate 2 without affecting an anchor layer-coating to prepare a filter laminate III.

Comparative Example 4

An aluminum plate with a thickness of 1.7 mm was drafted by a trimming die having a circle shape with a diameter of 90 mm and having an opening portion at the center portion with a diameter of 14 mm to prepare an aluminum disc 1. An aluminum plate with a thickness of 1.8 mm was drawn as the same shape of the bump of the filter substrate 1 used in Example 1, and laminated by overlapping the opening portions of the aluminum discs 1 as a means to provide gaps between the filter substrates to prepare a filter substrate 3. A hydrophilic layer was directly provided on the filter substrate 3 by using the coating solution for a hydrophilic layer 1 without coating an anchor layer, a filter laminate IV was prepared.

Evaluation; Evaluation methods of the filters prepared in Examples and Comparative examples are mentioned. Incidentally, since no hydrophilic layer exists in the filter of Comparative example 2, evaluation of water-and-scratch resistance was omitted.

<Thickness>

A thickness of the anchor layer and a thickness of the hydrophilic layer were measured from a sectional electron microscopic photograph of the filter single plate.

<Measurement of Average Surface Area of Pores>

Sizes of pores photographed in black color in an electron microscopic photograph of the surface of the filter single plate were measured by a ruler and a surface area per one pore was calculated. Total surface area of pores existing in the square with a size of 1 μm$^2$ was calculated, and an average value thereof was made an average surface area of pores.

<Initial Humidification Efficiency>

A filter portion of a humidifier (available from Tiger Corporation, hybrid type microcomputer humidifier, product number: ASQ-A500) was replaced with a filter laminate prepared in Example or Comparative example. In a room humidified at 20° C. and 30% RH, the humidifier was operated with an operation mode of "energy saving" (wind strength "strong", heater "off"). After one hour from initiation of the operation, a decreased amount of water in a water tank was measured, and the decreased amount was made initial humidification efficiency (cm$^3$/hr).

<Durable Humidification Efficiency>

A filter portion of a humidifier (available from Tiger Corporation, hybrid type microcomputer humidifier, product number: ASQ-A500) was replaced with a filter laminate prepared in Example or Comparative example. In a room humidified at 20° C. and 30% RH, the humidifier was continuously operated with an operation mode of "energy saving" (wind strength "strong", heater "off") for 2 weeks. The time just after 2 weeks from initiation of the operation was made a standard time, and after one hour from the standard time, a decreased amount of water in a water tank was measured, and the decreased amount was made durable humidification efficiency (cm$^3$/hr).

<Water-and-Scratch Resistance>

The surface of the filter single plate was wetted with water, both surfaces of the filter single plate were rubbed with a urethane surface of a sponge (available from Sumitomo 3M Limited, trade name: Scotch•Brite, catalogue No. S-21K) having an area of the base of 50 cm$^2$ to which a load corresponding to a weight with a mass of 2 kg was applied for each 100 times of back and forth rubbing on both surfaces, and after the test, the peeling state of the coated layer was observed with naked eyes. A denominator of the ratio of the surface area in the evaluation standard was made a sum of the both surfaces of the filter single plate.

◉: No peeling of the coated layer was admitted.

○: The coated layer with less than 1/4 (Ratio of surface area) of the portion rubbed with the sponge was peeled off.

Δ: The coated layer with 1/3 to 1/4 (Ratio of surface area) of the portion rubbed with the sponge was peeled off.

X: The coated layer with a portion exceeding 1/3 (Ratio of surface area) of the portion rubbed with the sponge was peeled off.

TABLE 20

|  | Hydrophilic layer thickness (μm) | Anchor layer thickness (μm) | Pore average surface area (μm$^2$) | Initial humidification efficiency (cm$^3$/hr) | Durable humidification efficiency (cm$^3$/hr) | Water-and-scratch resistance |
| --- | --- | --- | --- | --- | --- | --- |
| Example 1 | 3.1 | 1.1 | 0.003 | 222 | 222 | ◉ |
| Example 2 | 7.5 | 1.1 | 0.003 | 222 | 222 | ◉ |
| Example 3 | 1.5 | 1.1 | 0.003 | 220 | 220 | ◉ |
| Example 4 | 3.0 | 1.1 | 0.003 | 210 | 210 | ◉ |
| Example 5 | 3.3 | 1.1 | 0.004 | 230 | 230 | ◉ |
| Example 6 | 3.1 | 1.1 | 0.003 | 221 | 210 | ○ |
| Example 7 | 7.5 | 1.1 | 0.003 | 221 | 210 | ○ |
| Example 8 | 1.5 | 1.1 | 0.003 | 220 | 210 | ○ |
| Example 9 | 3.1 | 1.1 | 0.003 | 220 | 220 | ○ |
| Example 10 | 3.1 | 1.1 | 0 | 160 | 160 | ◉ |
| Example 11 | 3.1 | 1.1 | 0.005 | 240 | 240 | ○ |
| Example 12 | 3.1 | 1.1 | 0.006 | 240 | 220 | Δ |
| Example 13 | 3.1 | 1.1 | 0.002 | 200 | 200 | ◉ |
| Example 14 | 3.1 | 1.1 | 0.001 | 180 | 180 | ◉ |
| Example 15 | 3.1 | 1.1 | Less than 0.001 | 170 | 170 | ◉ |
| Example 16 | 3.1 | 1.1 | 0.003 | 222 | 222 | ◉ |
| Example 17 | 3.1 | 1.1 | 0.003 | 222 | 222 | ◉ |
| Example 18 | 3.1 | 1.1 | 0.003 | 220 | 200 | Δ |
| Example 19 | 3.1 | 1.1 | 0.003 | 220 | 200 | ○ |
| Example 20 | 3.1 | 1.1 | 0.003 | 220 | 220 | ◉ |
| Example 21 | 8.0 | 1.1 | 0.003 | 220 | 220 | ◉ |
| Example 22 | 0.5 | 1.1 | 0.003 | 210 | 200 | ○ |
| Example 23 | 0.3 | 1.1 | 0.003 | 200 | 190 | ○ |
| Example 24 | 8.2 | 1.1 | 0.003 | 220 | 200 | ◉ |
| Comparative example 1 | 3.0 | — | 0.003 | 220 | 100 | X |

TABLE 20-continued

|  | Hydrophilic layer thickness (μm) | Anchor layer thickness (μm) | Pore average surface area (μm²) | Initial humidification efficiency (cm³/hr) | Durable humidification efficiency (cm³/hr) | Water-and-scratch resistance |
|---|---|---|---|---|---|---|
| Comparative example 2 | — | — | 0 | 70 | 70 | — |
| Comparative example 3 | 3.0 | — | 1 or more | 100 | 70 | X |
| Comparative example 4 | 3.0 | — | 0.003 | 100 | 70 | X |

The evaluation results are shown in Table 20. The vaporization filters of Examples have high durable humidification efficiency and water-and-scratch resistance. In Comparative example 1 and Comparative example 4, after the durable humidification efficiency test, floating materials which had been considered to be fragments of the hydrophilic layer peeled off in the water tank were observed. In Comparative example 2, no hydrophilic layer is present, so that a water layer could not be formed on the surface of the filter single plate, and sufficient humidification efficiency could not be obtained. In Comparative example 3, since the substrate was a foamy shape, supplied water had maintained in the substrate in a buried state, and no water layer was formed on the surface thereof, so that drying efficiency of the maintained water was lowered and sufficient initial humidification efficiency could not be obtained. The durable humidification efficiency was also lowered, and when the inside of the foamy shaped substrate after the evaluation was observed, precipitation of scales which could not be observed in the vaporization filters of Examples could be observed.

From the comparison of Example 10 and Examples 1 to 9 and 11 to 21, when the hydrophilic layer contains fine particles, it has pores with minute surface area exist on the surface of the hydrophilic layer. Thus, a maintained amount of the water layer formed on the surface thereof was increased, whereby the initial humidification efficiency was improved.

From the comparison of Examples 1 to 9, and 11 to 17, in the vaporization filters of Examples 1 to 9, 11 to 14, 16 to 17 where the contents of the fine particles were 30% by weight or more and 90% by weight or less, they had high initial humidification efficiency and water-and-scratch resistances. In Example 12 wherein the content of the fine particles were exceeding 90% by weight, it was observed that the water-and-scratch resistance was tend to be lowered. In Example 15 in which the content of the fine particles is less than 30% by weight, it was observed that the initial humidification efficiency tends to be lowered.

From the comparison of Example 21 and Example 24, when the thickness of the hydrophilic layer exceeded 8.0 mm, it was observed a tendency that the durable humidification efficiency had been lowered. From the comparison of Example 22 and Example 23, when the thickness of the hydrophilic layer lowered 0.5 mm, it was observed a tendency that the initial humidification efficiency and durable humidification efficiency had been lowered.

From the comparison of Examples 1 to 3 and Examples 6 to 8, the hydrophilic layer is cross-linked by a cross-linking agent (silane coupling agent), the water-and-scratch resistance has improved. Incidentally, with regard to Examples 1 to 5 and Example 9 to which a cross-linking agent has been added, the durable humidification efficiency test and the water-and-scratch resistance test were repeatedly carried out for each 5 times, but the durable humidification efficiency was not lowered, and a remarkable effect that it can be used again and again was observed. On the other hand, in the vaporization filters of Examples 6 to 8 using no cross-linking agent, peeling of the hydrophilic layer was admitted in the evaluation of the water-and-scratch resistance. The evaluation was "○", but the degree of peeling was extremely light, and no peeling which reached to an anchor layer was admitted so that it had a sufficient strength for practical use.

UTILIZABILITY IN INDUSTRY

The vaporization filter for humidification of the present invention can be preferably used not only in a humidifier, but also to provide humidification function to an air cleaner, etc.

The invention claimed is:

1. A vaporization filter for humidification which comprises a filter substrate, and an anchor layer containing a film-forming polymer and a hydrophilic layer being provided on the substrate in this order,
   wherein
   the filter substrate is a non-foamy shape plate made of resin, or a plate made of metal, and
   in the hydrophilic layer, pores never exist at the surface of the hydrophilic layer, or even when one or more pores exist at the surface of the hydrophilic layer, the one or more pores are each an extremely minute sized pore having an average surface area of 0.1 μm² or less.

2. The vaporization filter for humidification according to claim 1, wherein said hydrophilic layer contains fine particles.

3. The vaporization filter for humidification according to claim 2, wherein a ratio of fine particles contained in said hydrophilic layer is 30% by weight or more and 90% by weight or less.

4. The vaporization filter for humidification according to claim 1, wherein said hydrophilic layer is cross-linked.

5. The vaporization filter for humidification according to claim 1, wherein a thickness of said hydrophilic layer is 0.5 μm or more and 8.0 μm or less.

6. A vaporization filter laminate for humidification which comprises the vaporization filters for humidification according to claim 1 which are being laminated with a distance to each other.

7. A humidification method using the vaporization filter for humidification according to claim 1, which comprises carrying out humidification by vaporizing water of a water layer formed on a surface of the hydrophilic layer.

8. A humidification method using the vaporization filter for humidification according to claim 1, which comprises carrying out humidification by continuously vaporizing water of a water layer formed on a surface of the hydrophilic layer.

9. A humidification method using the vaporization filter laminate for humidification according to claim 6, which comprises carrying out humidification by vaporizing water of a water layer formed on a surface of the hydrophilic layer.

10. A humidification method using the vaporization filter laminate for humidification according to claim 6, which comprises carrying out humidification by continuously vaporizing water of a water layer formed on a surface of the hydrophilic layer.

* * * * *